US012809377B2

(12) United States Patent
Gallagher et al.

(10) Patent No.: US 12,809,377 B2
(45) **Date of Patent: *Nov. 24, 2026**

(54) DYNAMIC ACTIVE CONTROL SYSTEM

(71) Applicant: Seakeeper, Inc., California, MD (US)

(72) Inventors: Michael Gallagher, Cleveland, OH (US); Andrew Semprevivo, Wyomissing, PA (US); John Adams, Russell Springs, KY (US)

(73) Assignee: SEAKEEPER, INC., California, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 19/232,683

(22) Filed: Jun. 9, 2025

(65) Prior Publication Data

US 2025/0306591 A1 Oct. 2, 2025

Related U.S. Application Data

(63) Continuation of application No. 17/871,861, filed on Jul. 22, 2022, now Pat. No. 12,326,735.

(Continued)

(51) Int. Cl.

| | |
|---|---|
| ***G05D 1/00*** | (2024.01) |
| ***B63B 39/04*** | (2006.01) |
| ***B63B 39/06*** | (2006.01) |
| ***B63B 79/10*** | (2020.01) |
| ***B63B 79/40*** | (2020.01) |

(Continued)

(52) U.S. Cl.

CPC ........... *G05D 1/0875* (2013.01); *B63B 39/04* (2013.01); *B63B 39/061* (2013.01); *B63B 79/10* (2020.01); *B63B 79/40* (2020.01); *B63H 20/02* (2013.01); *B63H 20/12* (2013.01); *G05D 1/0206* (2013.01); *G05D 1/49* (2024.01);

(Continued)

(58) Field of Classification Search

CPC ...... G05D 1/0875; G05D 1/0206; G05D 1/49; G05D 2109/30; G05D 2109/34; B63B 39/04; B63B 39/061; B63B 79/10; B63B 79/40; B63B 2001/325; B63B 1/322; B63H 20/02; B63H 20/12; B63H 2020/003; B63H 2021/216; B63H 20/22

See application file for complete search history.

(56) References Cited

U.S. PATENT DOCUMENTS

| | | | |
|---|---|---|---|
| 4,524,942 | A | 6/1985 | Kueny |
| 4,749,926 | A | 6/1988 | Ontolchik |

(Continued)

FOREIGN PATENT DOCUMENTS

| | | | |
|---|---|---|---|
| AU | 783746 | B2 | 1/2003 |
| CA | 2795437 | | 4/1928 |

(Continued)

OTHER PUBLICATIONS

US 11,198,496 B2, 12/2021, Wong et al. (withdrawn)

(Continued)

*Primary Examiner* — Abdalla A Khaled

(74) *Attorney, Agent, or Firm* — MARSHALL, GERSTEIN & BORUN LLP

(57) ABSTRACT

A dynamic active control system configured for counteracting dynamic motions of a marine vessel. The system may include at least one sensor, a plurality of water engagement devices, and a software module.

17 Claims, 3 Drawing Sheets

Related U.S. Application Data

(60) Provisional application No. 63/225,291, filed on Jul. 23, 2021.

(51) Int. Cl.

| | |
|---|---|
| ***B63H 20/02*** | (2006.01) |
| ***B63H 20/12*** | (2006.01) |
| ***G05D 1/49*** | (2024.01) |
| *B63H 20/00* | (2006.01) |
| *B63H 21/21* | (2006.01) |
| *G05D 109/30* | (2024.01) |

(52) U.S. Cl.

CPC .. *B63H 2020/003* (2013.01); *B63H 2021/216* (2013.01); *G05D 2109/30* (2024.01); *G05D 2109/34* (2024.01)

(56) References Cited

U.S. PATENT DOCUMENTS

| | | | |
|---|---|---|---|
| 5,142,497 | A | 8/1992 | Warrow |
| 5,263,432 | A | 11/1993 | Davis |
| 5,385,110 | A | 1/1995 | Bennett et al. |
| D362,841 | S | 10/1995 | Roza |
| 5,474,012 | A | 12/1995 | Yamada et al. |
| 6,041,730 | A | 3/2000 | Oliverio et al. |
| 6,268,053 | B1 | 7/2001 | Woiszwillo et al. |
| 6,273,771 | B1 | 8/2001 | Buckley et al. |
| 6,354,237 | B1 | 3/2002 | Gaynor et al. |
| 6,417,469 | B1 | 7/2002 | Tamura |
| 6,579,072 | B2 | 6/2003 | Trousil et al. |
| 6,592,412 | B1 | 7/2003 | Geil et al. |
| 6,651,574 | B1 | 11/2003 | Ellens et al. |
| 6,659,816 | B2 | 12/2003 | Fuse |
| 6,766,962 | B2 | 7/2004 | Paul et al. |
| 6,874,441 | B2 | 4/2005 | Pigeon |
| D507,543 | S | 7/2005 | Ishii et al. |
| 6,928,948 | B1 | 8/2005 | Shannon |
| 7,025,026 | B2 | 4/2006 | Young et al. |
| 7,040,937 | B2 | 5/2006 | Scott et al. |
| 7,059,347 | B2 | 6/2006 | Schwartzman |
| 7,128,014 | B2 | 10/2006 | Berthiaume et al. |
| 7,128,626 | B2 | 10/2006 | Dundra et al. |
| 7,128,627 | B2 | 10/2006 | Ferguson |
| 7,137,347 | B2 | 11/2006 | Wong et al. |
| 7,140,315 | B2 | 11/2006 | Okuyama |
| 7,156,708 | B2 | 1/2007 | Dudra |
| 7,171,982 | B2 | 2/2007 | Dudra |
| 7,258,072 | B2 | 8/2007 | Wong et al. |
| 7,278,367 | B1 | 10/2007 | Gonring et al. |
| 7,285,738 | B2 | 10/2007 | Lavigne et al. |
| 7,311,058 | B1 | 12/2007 | Brooks et al. |
| 7,318,386 | B2 | 1/2008 | Dudra et al. |
| D562,753 | S | 2/2008 | Wall et al. |
| D562,754 | S | 2/2008 | Wall et al. |
| 7,364,482 | B1 | 4/2008 | Wong et al. |
| 7,407,420 | B2 | 8/2008 | Fetchko et al. |
| 7,479,607 | B2 | 1/2009 | Sack et al. |
| 7,497,183 | B2 | 3/2009 | Dudra et al. |
| 7,597,552 | B2 | 10/2009 | Young et al. |
| 7,601,040 | B2 | 10/2009 | Morvillo |
| 7,631,610 | B1 | 12/2009 | Wolske |
| 7,641,525 | B2 | 1/2010 | Morvillo |
| 7,717,462 | B2 | 5/2010 | Liu et al. |
| 7,722,418 | B2 | 5/2010 | Ellens et al. |
| 7,743,721 | B2 | 6/2010 | Barrett et al. |
| 7,806,142 | B2 | 10/2010 | Baros et al. |
| 7,905,156 | B2 | 3/2011 | Scott et al. |
| 7,958,837 | B1 | 6/2011 | Fraleigh |
| 7,975,638 | B1 | 7/2011 | Harris et al. |
| 8,007,330 | B2 | 8/2011 | Wong et al. |
| 8,025,006 | B2 | 9/2011 | Baros |
| 8,028,510 | B2 | 10/2011 | Scott et al. |
| 8,042,480 | B2 | 10/2011 | Simons |
| 8,062,010 | B2 | 11/2011 | Paramonoff et al. |
| D654,880 | S | 2/2012 | Iam |
| 8,113,892 | B1 | 2/2012 | Gable et al. |
| 8,141,789 | B2 | 3/2012 | Schwartzman et al. |
| 8,145,371 | B2 | 3/2012 | Rae et al. |
| 8,151,723 | B2 | 4/2012 | Winiski et al. |
| 8,170,734 | B2 | 5/2012 | Kaji |
| 8,182,396 | B2 | 5/2012 | Martin et al. |
| 8,261,682 | B1 | 9/2012 | DeVito |
| 8,264,338 | B2 | 9/2012 | Leon |
| 8,347,859 | B2 | 1/2013 | Garon et al. |
| 8,387,589 | B2 | 3/2013 | Wong et al. |
| 8,406,944 | B2 | 3/2013 | Garon et al. |
| 8,425,270 | B2 | 4/2013 | Dudra et al. |
| 8,430,702 | B2 | 4/2013 | Davidson et al. |
| 8,435,088 | B2 | 5/2013 | Morettin et al. |
| 8,457,820 | B1 | 6/2013 | Gonring |
| 8,516,916 | B2 | 8/2013 | Scott et al. |
| 8,550,023 | B1 | 10/2013 | Quail |
| 8,578,838 | B2 | 11/2013 | Davidson |
| 8,578,873 | B2 | 11/2013 | Gasper et al. |
| 8,583,300 | B2 | 11/2013 | Oehlgrien et al. |
| 8,610,013 | B2 | 12/2013 | Schmidt et al. |
| 8,612,072 | B2 | 12/2013 | Garon et al. |
| D698,304 | S | 1/2014 | Dubois et al. |
| D698,357 | S | 1/2014 | Mainville et al. |
| 8,626,962 | B2 | 1/2014 | Wong et al. |
| 8,631,753 | B2 | 1/2014 | Morvillo |
| 8,672,086 | B2 | 3/2014 | Wong et al. |
| 8,683,300 | B2 | 3/2014 | Stek et al. |
| 8,751,015 | B2 | 6/2014 | Frewin et al. |
| 8,769,944 | B2 | 7/2014 | Redfern |
| 8,845,490 | B2 | 9/2014 | Chan et al. |
| D720,305 | S | 12/2014 | Wenji |
| 8,901,443 | B2 | 12/2014 | Baker et al. |
| 8,930,050 | B2 | 1/2015 | Garon et al. |
| 8,931,707 | B2 | 1/2015 | Wilnechenko et al. |
| 8,957,338 | B2 | 2/2015 | Li |
| D725,050 | S | 3/2015 | Tsugawa et al. |
| D725,612 | S | 3/2015 | Schlegel et al. |
| 8,992,273 | B2 | 3/2015 | Winiski et al. |
| D727,190 | S | 4/2015 | Higgs |
| 8,997,628 | B2 | 4/2015 | Sall et al. |
| 9,032,898 | B2 | 5/2015 | Widmark |
| 9,068,855 | B1 | 6/2015 | Guglielmo |
| 9,104,227 | B2 | 8/2015 | Clarke et al. |
| 9,233,740 | B2 | 1/2016 | Morvillo |
| 9,260,161 | B2 | 2/2016 | Gasper et al. |
| 9,278,740 | B1 | 3/2016 | Andrasko et al. |
| 9,334,022 | B2 | 5/2016 | Gasper et al. |
| 9,340,257 | B2 | 5/2016 | Ulgen |
| D758,325 | S | 6/2016 | Cook et al. |
| D758,975 | S | 6/2016 | Hunter et al. |
| 9,377,780 | B1 | 6/2016 | Arbuckle et al. |
| 9,423,894 | B2 | 8/2016 | Olsson et al. |
| 9,459,787 | B2 | 10/2016 | Kulczycki et al. |
| 9,522,723 | B1 | 12/2016 | Andrasko et al. |
| 9,559,649 | B2 | 1/2017 | Noh et al. |
| D782,987 | S | 4/2017 | Gassner |
| 9,631,753 | B2 | 4/2017 | Wood et al. |
| 9,689,395 | B2 | 6/2017 | Hartman |
| 9,710,077 | B2 | 7/2017 | Okazaki |
| 9,733,645 | B1 * | 8/2017 | Andrasko .............. B63H 25/02 |
| 9,745,020 | B2 | 8/2017 | Snow |
| 9,834,293 | B2 | 12/2017 | Wood et al. |
| D807,309 | S | 1/2018 | Johnson et al. |
| 9,857,794 | B1 | 1/2018 | Jarrell et al. |
| 9,896,173 | B2 | 2/2018 | Baros et al. |
| 9,911,556 | B2 | 3/2018 | Lee et al. |
| 9,944,377 | B2 | 4/2018 | Davidson et al. |
| 9,950,771 | B1 | 4/2018 | Hartman et al. |
| D818,973 | S | 5/2018 | Tang et al. |
| 9,978,540 | B2 | 5/2018 | Tanaka et al. |
| 9,988,126 | B2 | 6/2018 | Wood |
| 9,994,291 | B2 | 6/2018 | Scott |
| 10,000,268 | B1 | 6/2018 | Poirier et al. |
| 10,040,522 | B1 | 8/2018 | Hartman et al. |
| 10,112,692 | B1 | 10/2018 | Anschuetz |
| 10,202,179 | B2 | 2/2019 | Wong et al. |
| 10,281,928 | B2 | 5/2019 | Behling et al. |

(56) References Cited

U.S. PATENT DOCUMENTS 10,358,189 B2 7/2019 Sheedy et al.
10,370,070 B2 8/2019 Fetchko et al.
10,386,834 B2 8/2019 Green et al.
D858,465 S 9/2019 Desbiens
10,431,099 B2 10/2019 Stewart et al.
10,457,371 B2 10/2019 Hara et al.
D884,856 S 5/2020 Jones et al.
10,647,399 B2 5/2020 Davidson et al.
10,671,073 B2 6/2020 Arbuckle et al.
10,683,073 B2 6/2020 Redfern et al.
10,683,074 B2 6/2020 Davidson et al.
10,696,368 B2 6/2020 Mizutani et al.
10,696,369 B2 6/2020 Takase et al.
10,766,590 B2 9/2020 Nanjo et al.
10,781,947 B2 9/2020 Fetchko et al.
10,829,191 B2 11/2020 Wong et al.
10,889,358 B2 1/2021 Wong et al.
10,906,623 B2 2/2021 Chan et al.
10,940,927 B2 3/2021 Chan et al.
11,000,268 B2 5/2021 Poucher et al.
11,040,757 B2 6/2021 Huyge et al.
11,155,322 B2 10/2021 Baros
11,319,916 B2 5/2022 Strang et al.
11,372,411 B1 6/2022 Deringer
11,433,981 B2 9/2022 Chan et al.
11,465,726 B2 10/2022 Nakatani
11,467,583 B2 10/2022 Mizutani
11,530,022 B1 12/2022 Andrasko et al.
11,679,853 B2 6/2023 Wong et al.
11,685,499 B1 6/2023 Arbuckle
11,993,357 B2 5/2024 Ikegaya
12,017,746 B2* 6/2024 Wong ..................... B63H 25/04
2003/0082964 A1 5/2003 Simner
2005/0233655 A1 10/2005 Maselter
2007/0006101 A1 1/2007 Michaels
2007/0238370 A1 10/2007 Morvillo
2007/0276563 A1 11/2007 Kaji
2009/0076671 A1 3/2009 Mizutani
2009/0165694 A1 7/2009 Beamer
2010/0094491 A1* 4/2010 Oehlgrien ................ G05D 1/49 73/178 R
2010/0102173 A1 4/2010 Everett et al.
2010/0198435 A1 8/2010 Cansiani et al.
2011/0000268 A1 1/2011 Schaafsma et al.
2011/0120364 A1 5/2011 Mueller
2011/0143608 A1 6/2011 Chiecchi
2011/0151732 A1 6/2011 Chiecchi
2011/0320072 A1 12/2011 Morvillo
2012/0103774 A1 5/2012 Jun
2012/0247934 A1 10/2012 Schmidt et al.
2013/0213293 A1 8/2013 Gasper et al.
2014/0043303 A1 2/2014 Baker et al.
2014/0183011 A1 7/2014 Park et al.
2014/0224166 A1 8/2014 Morvillo
2014/0348207 A1 11/2014 Wilnechenko et al.
2014/0365050 A1 12/2014 Morvillo
2016/0097393 A1 4/2016 Hartman
2017/0250037 A1 8/2017 Tanaka et al.
2017/0313386 A1 11/2017 Snow
2017/0349257 A1 12/2017 Hara et al.
2017/0351259 A1* 12/2017 Tamura ................... B63B 79/10
2018/0074503 A1* 3/2018 Meier ..................... B63B 79/10
2018/0201342 A1 7/2018 Huyge et al.
2020/0303235 A1 9/2020 Miyadate et al.
2020/0354030 A1 11/2020 Bowie
2020/0391838 A1 12/2020 Inque
2021/0107617 A1 4/2021 Nakatani
2021/0173413 A1 6/2021 Deringer
2021/0291943 A1 9/2021 Inque
2022/0004125 A1 1/2022 Mitsumata et al.
2022/0306257 A1 9/2022 Afman
2022/0334596 A1 10/2022 Chan et al.
2022/0355913 A1 11/2022 Davidson et al.
2023/0021635 A1* 1/2023 Gallagher ............. B63B 39/061
2023/0030018 A1* 2/2023 Ross ....................... B63B 39/04
2023/0073225 A1 3/2023 Chan et al.
2023/0166823 A1 6/2023 Wood et al.
2023/0257096 A1 8/2023 Wong et al.
2023/0286634 A1* 9/2023 Koga ........................ B63B 1/24
2023/0303235 A1 9/2023 Wong et al.
2024/0025528 A1* 1/2024 Derginer .............. B63H 21/213
2024/0116616 A1* 4/2024 Moruzzi ................ G05G 5/065
2024/0132195 A1* 4/2024 Hamada ................. B63H 21/21
2024/0132196 A1 4/2024 Shirao
2024/0182142 A1* 6/2024 Filippou ............... B63B 39/061

FOREIGN PATENT DOCUMENTS

CA 3043073 A 9/1930
CA 2236483 C 5/1998
CA 2372402 C 2/2002
CA 3048271 A1 6/2019
CA 3048276 A1 6/2019
CA 3048282 A1 12/2020
CN 109110073 A 1/2019
CN 112124548 A 12/2020
DE 19837888 C1 8/1998
EP 0928739 A2 7/1999
JP H0350087 A 3/1991
JP H0382697 A 4/1991
JP H03114996 A 5/1991
JP H06255577 A 9/1994
JP H09286390 A 11/1997
JP H09315384 A 12/1997
JP 2001294197 A 10/2001
JP 2002-284087 A 10/2002
JP 2003341589 A 12/2003
JP 2004224103 A 8/2004
JP 2005-280550 A 10/2005
JP 2005324716 A 11/2005
JP 2009037287 A 4/2009
JP 2012-035786 A 2/2012
JP 2013035351 A 2/2013
JP 2013100102 A 5/2013
JP 2014196091 A 10/2014
JP 2018030573 A 3/2018
KR 10-2011-0078767 A 7/2011
KR 10-2011-0139800 A 12/2011
KR 10-2012-0019280 A 3/2012
KR 10-1259134 B1 4/2013
KR 10-1297596 B1 8/2013
KR 10-2013-0119071 A 10/2013
KR 10-1491661 B1 2/2015
KR 10-2017-0143039 A 12/2017
KR 10-2275079 B1 7/2021
WO 2003068590 A2 8/2003
WO 2006058232 A1 6/2006
WO 2008100903 A2 8/2008
WO 2009134153 A1 5/2009
WO 2010003905 A1 1/2010
WO 2011099931 A1 8/2011
WO 2011142870 A2 11/2011
WO 2016036616 A1 3/2016
WO 2016209401 A1 12/2016
WO 2023092228 A1 1/2023

OTHER PUBLICATIONS

European Search Report issued in Application No. 22846717.1, dated Jul. 1, 2025, 4 pgs.
International Search Report and Written Opinion, filed in PCT/US2022/038962 dated Nov. 16, 2022; 7 pgs.
International Search Report and Written Opinion, filed in PCT/US2022/038102 dated Nov. 15, 2022; 9 pgs.
International Search Report and Written Opinion, filed in PCT/US2022/038964 dated Nov. 28, 2022; 8 pgs.
International Search Report and Written Opinion, filed in PCT/US2022/040944 dated Dec. 2, 2022; 7 pgs.
AutoTrimPro Electric Owner Install Guide; 48 pgs.
Trygve Lauvdal and Thor I. Fossen; Norwegian University of Science and Technology, Department of Engineering Cybernetics, n-7034 Trondheim, Norway; Nonlinear Non-Minimum Phase Rudder-Roll Damping System for Ships Using Sliding Mode Control; 6 pgs.

(56) References Cited

OTHER PUBLICATIONS

Asgei J. Sorenson; Department of Marine Technology, Norwegian University of Science and Technology ; 2013 Department of Marine Technology, NTNU; Marine Control Systems, Propolsion and Motion Control of Ships and Ocean Sructures Lecture Notes; 536 pgs.

European Patent Office Extended European Search Report mailed Aug. 26, 2022 from corresponding European Patent Application No. 19869718.7; 7 pages.

WIPO, Canadian International Searching Authority, International Search Report mailed Dec. 13, 2019 in corresponding International Patent Application No. PCT/CA2019/051410, 3 pages.

WIPO, Canadian International Searching Authority, Written Opinion mailed Dec. 4, 2019 in corresponding International Patent Application No. PCT/CA2019/051410, 6 pages.

LENCO-We Make The Best Boats Better !; The World Leader In Trim Tab Systems & Hatch Lift Innovation Owner's Manual; May 21, 2019; 28 pgs.

Volvo Penta; Boat Trim System; Mar. 2017; 4 pgs.

Australian Boat Magazine; The Intriguing Zipwake Trim; May 2015; 6 pgs.

Interceptors/Trim Tabs/Force Producers for Ship Motion Control—Maritime Dynamics, Inc.

* cited by examiner

DYNAMIC ACTIVE CONTROL SYSTEM

CROSS-REFERENCE TO RELATED APPLICATION

This Application is a continuation of U.S. Non-Provisional patent application Ser. No. 17/871,861, filed on Jul. 22, 2022, which claims the benefit of and priority to U.S. Provisional Application No. 63/225,291, filed Jul. 23, 2021, all the content of which is hereby incorporated by reference in their entirety.

FIELD OF THE DISCLOSURE

The present disclosure generally relates to a stability control system with engine control for providing optimum performance and control of dynamic active motions of a marine vessel, watercraft or boat (collectively, a marine vessel for brevity). More particularly, the present disclosure is directed to an improved dynamic active control system (DACS) configured to receive data output from a plurality of sensors and control the deployment of the actuators to cause the vessel to operate with desired pitch, roll and yaw axis control.

BACKGROUND

The following terms and related definitions are used in the marine stabilization industry. “Trim Control” means the control of the average angle about the lateral or pitch axis of a marine vessel, averaged over one second or more. “List Control” or “Roll Control” means the control of the average angle about the longitudinal or roll axis of a marine vessel, averaged over one second or more. “Yaw Control” means the control of the average angle about the yaw axis of a marine vessel, averaged over one second or more. A “Water Engagement Device” or “WED” means a mechanical or electromechanical device configured to generates a variable amount of lift in a marine vessel by selective engagement of the device with or into the water flow under or adjacent to a transom surface of the marine vessel when the marine vessel is underway in a certain (or forward) direction or by changing the angle of attack of the device relative to the water flow during operation of a marine vessel in a forward direction. A WED can also be referred to as a Controller in the system disclosed herein and any reference to a Controller and/or a WED means the same device. A WED delta position is defined as the difference between port and starboard WED deployments. “Deployment” means selective engagement of the WED with or into the water flow or a change in the WED angle of attack. A Roll Moment in a marine vessel is the result of a force applied to the vessel that causes the vessel to rotate about its longitudinal or roll axis. A Pitch Moment in a marine vessel is the result of a force applied to the vessel that causes the vessel to rotate about its lateral or pitch axis. A Yaw Moment in a marine vessel is the result of a force applied to the vessel that causes the vessel to rotate about its vertical or yaw axis. For instance, (1) a “Roll Moment” can be generated if the port and starboard WEDs are deployed asymmetrically in a marine vessel that may cause the vessel to roll; (2) a “Yaw Moment” can be generated when port and starboard WEDs are deployed asymmetrically which may cause a heading change; and (3) a “Pitch Moment” can be generated if the port and starboard WEDs are deployed symmetrically or if a single WED is deployed about the center of the marine vessel which may cause the vessel to pitch.

Conventional marine stabilization techniques for when a vessel is underway in a forward direction include proportional deployment of WEDs to generate a continuous lift at the transom of the vessel for trim control while allowing adjustment of the angles (e.g., along the roll, pitch and yaw axis) of the marine vessel. A few examples of commercially available WEDs—not to be considered exhaustive by any means—are interceptors, trim tabs, and fins and other similar devices that can engage the water flow in similar fashion and provide similar functionality.

An alternate marine stabilization technique for when a vessel is not underway is a gyroscopic stabilization system that, in one of the commercially available versions, generates a torque that is proportional to the rate of precession and angular momentum. In such a gyroscopic stabilization system, a torque is applied to one or more axes depending on the orientation of the spin axis and its precession angle. The amount of torque applied to the roll, pitch and/or yaw axis can be calculated as a function of angular momentum, rate of precession, angle of precession, and precession orientation of the control moment gyroscope. The system disclosed herein makes it possible to calculate the engine steering angle change (or change in the rudder position) that would counter the torque applied about the yaw axis from a control moment gyroscopic stabilization system.

Marine stabilization technologies are key to experiencing the joy of cruising over waters without the attendant random environmentally induced disturbances of the boat. These disturbances—for example, a sudden unexpected roll—can be annoying and disruptive for boaters. In the existing prior art systems, WEDs are designed and configured to control list and trim—to get the marine vessel to an average angle in the roll and pitch axis. Smaller marine vessels used in the recreational market generally have manually actuated WEDs, while larger vessels operating in the commercial space use automatic actuated WEDs to stabilize the motion. However, such prior art systems do not combine DACS with engine control for complete vessel stabilization.

In addition, there are no currently available prior art recreational or commercial stability control systems that combine the fast deployment of WEDs with engine trim adjustments and engine steering angle adjustment. More specifically, prior art systems lack the combination of fast deployment of WEDs with adjustment of the engine steering angle of the marine vessel to counter changes in drag due to asymmetric deployment, gyroscopic stabilization yaw moment, and/or adjustment of the engine trim for dynamic control in the pitch axis.

In view of the foregoing disadvantages of prior art systems in the relevant field of marine stabilization, there is clearly a market need for an improved stability control system of a marine vessel—a dynamic active control system (DACS) configured to simultaneously control accelerations, rates and angles in the roll, pitch and yaw axes of the marine vessel and engine trim and engine steering angle adjustments of the marine vessel. The DACS disclosed herein provides significant technological advantages from conventional systems while overcoming the disadvantages of the prior art systems, as discussed below.

BRIEF SUMMARY OF THE DISCLOSURE

The present disclosure is directed to a DACS configured for simultaneous control of marine vessel motions in all three axes, namely pitch, roll and yaw by fast deployment and actuation of the WEDs. The DACS is configured with proprietary inertial sensing hardware and software in order to learn, capture and make a determination and/or predict the various motions of the marine vessel in all three axes and command deployment of the actuator blades to counteract any pitch, roll, and yaw motions of the vessel as well as total vessel pitch axis control facilitated by fast symmetric deployment of WEDs—alternatively referred as Controllers in the system disclosed herein-coupled with engine trim adjustments.

In an embodiment, the DACS is configured to provide total vessel roll axis and heading control by differentially deploying WEDs to counter rolling motions while simultaneously adjusting engine steering (or rudder) position to counter the steering moment associated with differentially deployed WEDs. In alternative embodiments, WEDs can be referred herein as Controllers and/or vice versa in the DACS disclosed herein. The novel DACS disclosed herein can (1) simultaneous control of motions in all three axes (total vessel pitch axis control) by fast symmetric deployment of WEDs, coupled with engine trim adjustments; (2) provide total roll and heading control by differentially deploying WEDs to counter rolling motions while simultaneously adjusting engine steering position to counter the steering moment associated with WED delta position; and (3) adjust the engine steering angle to counter yaw moments produced by gyroscopic stabilization systems. As disclosed herein, a total pitch axis control strategy includes symmetric deployment of a plurality of water engagement devices at a deployment speed of 100 mm/s or more while simultaneously adjusting an engine trim actuator. Similarly, a total roll and heading control strategy includes a differential deployment of the plurality of water engagement devices at a deployment speed of at 100 mm/s or more to counter a measured rolling motion while simultaneously adjusting a steering actuator to counter a measured yaw motion resulting from the differential deployment and adjusting the steering actuator to counter the measured yaw motion generated by a gyroscopic stabilization device adapted to be installed within the marine vessel.

In another embodiment, the DACS provides for automatically adjusting the engine steering angle to counter drag moment from a water engagement device delta position. The DACS comprises an embedded microprocessor-based software module located within an operational console—the software module communicatively and operatively connected to the engine (via the engine control module) of the marine vessel. In software module can be configured to connect with third-party systems—e.g., navigational system—to connect and exchange data and information. At least one water engagement device actuator digitally connected to the software module-the water engagement device configured to read a signal input from the software module and automatically generate water engagement device delta position changes to counter the roll motion resulting from a steering position change.

As further explained in detailed below, the DACS comprises an engine having an embedded engine control module communicatively and operatively connected to the software module. A plurality of water engagement device actuators adapted to be mounted on a transom of the marine vessel and communicatively and operatively connected to the software module. During operation of the marine vessel, the software module is further configured to send a signal in order to command a desired water engagement device delta position and combat dynamic motions of the marine vessel. In addition, the software module is further configured to measure the relationship between an engine steering angle and the water engagement device delta position and provide a signal output to the water engagement device actuator. Specifically, the software module provides a first signal output to the plurality of water engagement device actuators to command a water engagement device delta position in order to combat dynamic motions of the marine vessel. Further, the software module measures a relationship between an engine steering angle and the water engagement device delta position and, in response thereto, provides a second signal output to the plurality of water engagement device actuators. On receiving the second signal the plurality of water engagement device actuators, in response thereto, automatically generate a change in the water engagement device delta position to counter a roll motion resulting from a steering position change.

The software module is embedded with a microprocessor-based control system, the software module is further communicatively and operatively connected to a plurality of sensors. In another embodiment, the plurality of sensors can be integrated (embedded) within the software module. A gyroscopic stabilization device adapted to be disposed on the marine vessel and communicatively and operatively connected to the software module is further provided within the system. During operation of the marine vessel, the control system measures motion of the marine vessel by the inertial sensor and provides a signal output to a steering actuator to adjust a steering position automatically (a) in response to a yaw axis motion measured by the inertial sensor, and (b) based on an empirical estimate of a yaw torque generated by the gyroscopic stabilization device and a water engagement device delta position commanded by the control system, respectively, in order to counter a measured change of an output from the steering position sensor.

The software module is further connected to a distribution module—the distribution module configured as a pass-through module/device for wiring installation and providing a connection and distribution point for the various components of the DACS. The software module is further communicatively coupled to (1) a plurality of sensors (e.g., motion sensors positioned within the marine vessel); (2) a pair of actuators mounted adjacent the transom to deploy and retract the WEDs; and (3) an engine (or a propulsion unit) having an embedded engine-control unit (ECU) for providing adjustable trim, height and/or steering position/direction control; and/or (4) a gyroscopic stabilization device. The plurality of sensors comprises of at least one of the following: multi-axis inertial sensor for measuring rates or acceleration generated along multiple vector axes during the operation of the marine vessel; accelerometer sensor for measuring the longitudinal acceleration, lateral acceleration and vertical acceleration of the marine vessel respectively; Roll Rate Sensor (RRS), Pitch Rate Sensor (PRS) and Yaw Rate Sensor (YRS) to measure the roll rate, pitch rate and yaw rate of the marine vessel respectively. Further, at least one sensor, from the plurality of sensors is configured to measure data related to the WEDs/Controller retraction and deployment and measure and report data on steering angle, trim position, height of the engine during the vessel operation.

The software module may be further configured with proprietary machine learning/artificial intelligence algorithm for automatic optimization of the vessel operating characteristics and to predict motion and respond instantaneously to eliminate any undesirable vessel movements that are annoying, disruptive and uncomfortable for the operators or passengers of the vessel before they are felt by an operator. The artificial intelligence-based system is configured to learn how the boat is behaving in all three axes and automatically command deployment of the WEDs and/or adjustment of the engine trim, height and/or steering to counteract the pitch, roll, and/or yaw of the vessel for a perceived stable and controlled operation. Further, the AI-based system disclosed herein can make any necessary adjustment to the engine steering position to control the heading of the marine vessel.

During operation of the marine vessel, the software module may receive a signal (about the WED delta position), make a decision on what action is needed and then send a signal to the actuator to take that action—for example, counter the rolling motions and simultaneously adjust engine steering position to counter the steering moment associated with WED delta position. As disclosed herein, the system via the plurality of sensors located throughout the marine vessel (integrated or communicatively and operatively coupled to the software module) is capable of receiving the steering position from the engine via a digital communications bus and calculating the change of steering position across a certain timeline, relating the change in steering/rudder position to a change in roll angle and automatically adjusting the WED delta position as a result of this predicted change in roll angle.

In addition to the software module, the operational console comprises an optional multifunctional display unit and/or an operation input device (e.g., keypad)—the components communicatively and operatively connected to each other via digital communication buses. In another embodiment, the operational console functions as a control station for the operator of the marine vessel and can support a steering wheel, control lever or other similar devices or steering mechanism—other types of wheel, joystick, to maneuver the marine vessel. The software module communicatively coupled to the WEDs (or controllers) is further configured to a provide power, communications and/or data to the ECU, and the actuators for fast deployment of the WEDs.

In another embodiment, the DACS comprises an actuator having at least one WED/Controller mounted on the transom of the marine vessel and digitally connected to the software module. The system is capable of determining a desired WED delta position to combat dynamic motions of the marine vessel by measuring the relationship between an engine steering angle and the WED delta position, and monitoring and reading any data related to the WED delta position as an impending change in yaw rate, heading and roll angle of the marine vessel. Specifically, the system can (A) make the necessary adjustment to the engine steering angle to in order control the heading of the marine vessel and counter the resulting heading change from WED delta position; and (B) measure a change in steering position and predict the resulting roll motion generated from the steering position change, and automatically create WED/Controller delta position to counter the roll motion that will ultimately result from the steering position change.

As further described in the detailed disclosure, the DACS may be configured to provide total vessel yaw axis control to combat dynamic motions of the marine vessel in the yaw axis by monitoring measured yaw rates and differentially deploying the WEDs while simultaneously adjusting such deployment in response to a measured yaw rate to reduce the measured yaw rate. The system herein receives an operator command—a desired trim angle—and can (A) adjust the average positions of the WEDs as well as the engine trim angle in an effort to achieve the operator's desired trim angle; and (B) adjust the relationship between engine trim and WED average position to optimize either the performance of the DACS system or fuel efficiency of the engine of the marine vessel.

The DACS may be configured to monitor and read any data related to the differential deployment of the WEDs as an impending change in the yaw rate, heading and roll rate of the marine vessel. Based on the data received, the system can provide total roll axis and heading control by differentially deploying WEDs to counter roll axis moments while simultaneously adjusting engine steering position to counter the steering moment associated with differential controller deployment. The DACS may also be configured to adjust the engine steering angle to counter yaw moments produced by gyroscopic stabilization systems.

Certain embodiments are shown in the drawings. However, it is understood that the present disclosure is not limited to the arrangements and instrumentality shown in the attached drawings.

BRIEF DESCRIPTION OF THE DRAWINGS

The accompanying drawings incorporated in and forming a part of the specification illustrate several aspects of the present disclosure and, together with the description, serve to explain the principles of the embodiments. In the drawings.

DETAILED DESCRIPTION OF THE DISCLOSURE

Figure 1:
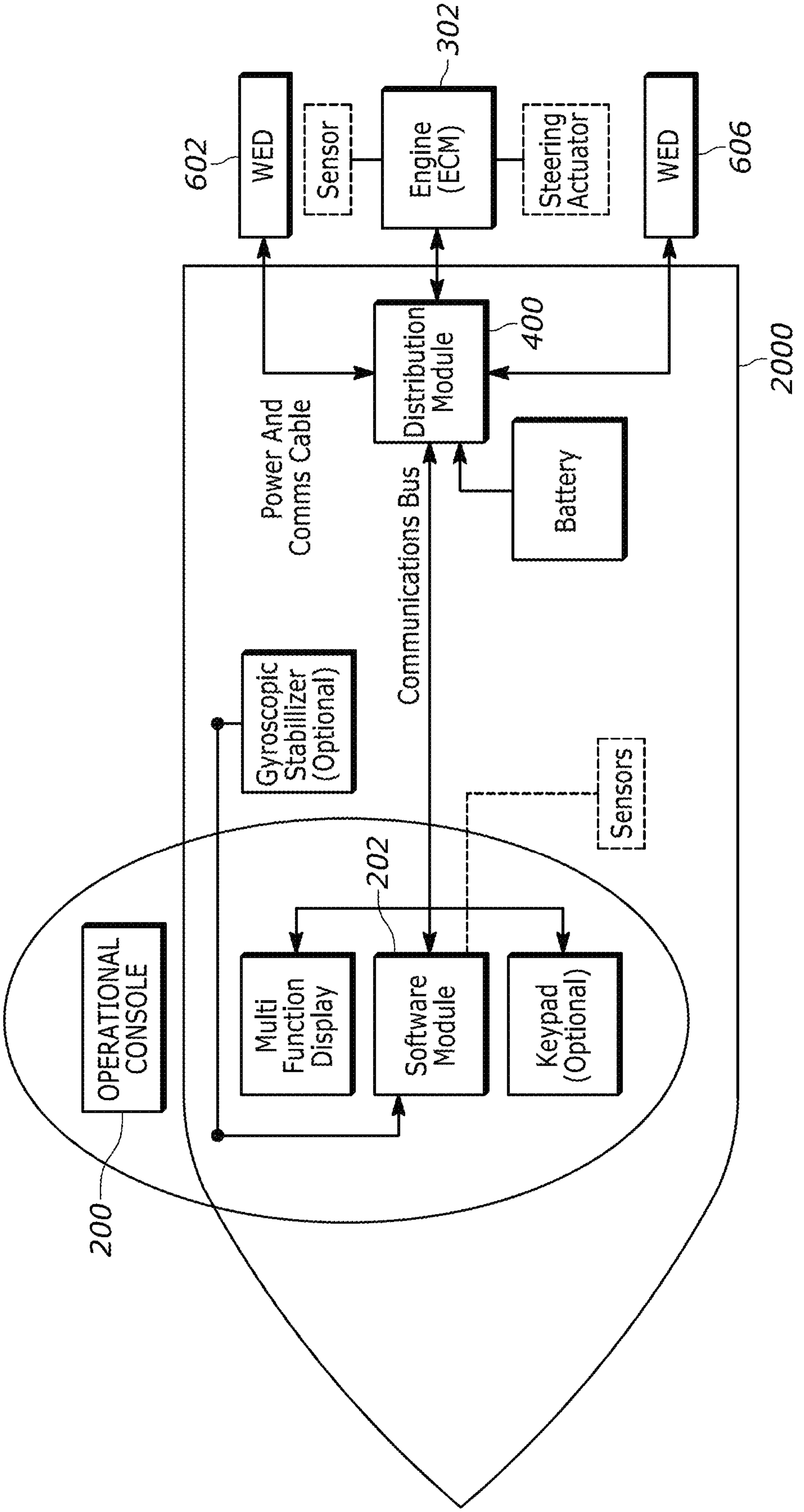
FIG. 1 illustrates an embodiment of the dynamic active control system with engine control comprising at least one pair of water engagement devices, a software module, an engine with engine control module, and a gyroscopic stabilization system connected to each other and various other modules and components according to one aspect of the present disclosure.

For the purposes of promoting and understanding the principles disclosed herein, reference is now made to the preferred embodiments illustrated in the drawings, and specific language is used to describe the same.

As illustrated in FIG. 1, the marine vessel 2000 comprises the DACS 1000 having a software module 202 located within an operational console 200 and mounted near the helm of the marine vessel 2000. The software module 202 is communicatively coupled to an engine having an embedded engine-control module 302 and a distribution module 400 located near the transom of the marine vessel 2000 and primarily used for supplying power and communication signals to the various components of the DACS 1000. The operational console 200 functions as a control station for the operator of the marine vessel and can support a steering wheel, control lever or other similar devices to steer and/or maneuver the marine vessel 2000. The software module 202 communicatively connected to the engine-control module 302 and configured to run the various operational algorithms for dynamic active control of the marine vessel 2000 provides for adjustable trim, height and/or steering position/direction control of the engine. As further illustrated in FIG. 1, the operational console 200, in addition to the software module 202 can include an optional multifunctional display unit 202 and/or an operation input device 204 (e.g., keypad)—the components communicatively and operatively connected to each other via digital communication buses.

Referring back to FIG. 1, the software module 202 includes a memory, and an embedded programmable processor configured to read data on a vessel's performance characteristics from the memory and provide data to the processor in order to run various operational algorithms for dynamic active control of the marine vessel 2000. For example, any data related to operational performance of the marine vessel (e.g., data related to critical failure of the system or a component of the marine vessel) can be stored within the memory of the software module 202. A plurality of sensors are communicatively and operatively connected with the software module 202. As shown, the software module 202 is communicatively and operatively coupled to (1) a plurality of sensors (e.g., motion sensors positioned within the marine vessel); (2) at least one pair of actuators mounted adjacent the transom of the vessel 2000 to deploy and retract the WEDs (or Controllers) 602, 606; and/or (3) a gyroscopic stabilizer 500. In another embodiment, additional WEDs—for instance, two pairs of WEDs with actuators mounted adjacent the transom of the vessel 2000 configured to deploy and retract—which can also be referred to as WEDs 602, 604, 606, 608—the WEDs 602, 604, 606 and 608 are substantially same in structure and functions in substantially the same manner. In another embodiment, the plurality of sensors may be integrated or embedded within the software module 202. Further, at least one sensor, from the plurality of sensors, is configured to measure data related to the retraction and deployment of each of the WED/Controller (602, 606) and to measure and report data on steering angle, trim position, height of the engine during the vessel operation.

The software module 202—communicatively coupled to the engine control module 302 of the engine of the marine vessel 2000—is further configured to a provide power, communications and/or data to the actuators for fast deployment of the WEDs 602, 606. Further, as illustrated in FIG. 1, the software module 202 can be connected to other peripheral devices via digital communication buses—additional sensors (e.g., a GPS sensor, voltage sensors, encoders, current sensors, temperature sensor and/or other sensors)—the software module 202 primarily responsible for measuring, feeding data to the engine control module 302 and/or the actuators connected to the WEDs 602, 606 and measuring and computing various performance characteristics for dynamic active control of the marine vessel 2000.

As illustrated in the DACS 1000 disclosed herein, the distribution module 400 is mounted and located in proximity to the transom of the marine vessel 2000 wherein the operational console 200 (including the software module 202) are mounted near the helm and not in proximity to the transom of the marine vessel 2000. The various modules are communicatively coupled to each other—specifically the engine control module 302, the software module 202, and the actuators for the WEDs (602, 606)—via industry standard power and communication cables, The WED actuator mounted on the transom of the marine vessel—the WED actuator configured to provide fast deployment of the WEDs in 100 mm/s or more (mm/s)—preferably faster than 250 mm/s. During operation of the marine vessel 2000, the system 1000 is further designed to generate signals—for example, a wake signal—for the software module 202 to communicate a "power on" (wake up) status to the various components of the system—namely, the engine-control module 302 and other components (displays, input devices etc.) of the operational console 200 and the actuators for fast deployment of the WEDs/Controllers 602, 606.

Referring back to FIG. 1, the software module 202 is further configured to store and display certain information (e.g., route maps, chart plot, etc.) and provide reliable marine navigation and guidance to an operator of the marine vessel 2000. Such navigation and guidance include provisions for connecting to certain OEM-specific Internet Protocol (IP) for network interface identification and location addressing, and to provide easy-to-use User Interface (UI) for vessel operators. For instance, the software module 202 can provide yaw and trim correcting information/commands to the engine and steering system to prevent the marine vessel from deviating from the present course. The software module 202 is primarily an embedded computing device running a certain type of Linux or other operating system providing equivalent functionality. As mentioned above, the system 1000 also includes an additional number of user input devices, such as a keypad, a steering wheel and one or more throttle/shift levers. Each of the devices communicatively connected to the software module 202 are configured to provide commands (input signal) to the processor—the processor in turn, communicates with the actuator associated with the respective WED/Controller (602, 606) via the actuator power and communications cable—as shown in FIG. 1—and provides instructions to the actuator for fast deployment of the WEDs/Controllers 602, 606.

The software module 202 further comprises a plurality of multi-axis inertial sensors for measuring rates or acceleration generated along multiple vector axes during the operation of the marine vessel 2000. The software module 202 is configured to be communicatively and operatively connected to the plurality of multi-axis inertial sensors—including, for example, the accelerometer sensors for measuring accelerations along the x, y and z axes (longitudinal acceleration, lateral acceleration and vertical acceleration), sensors to measure the roll rate, pitch rate and yaw rate—Roll Rate Sensor (RRS), Pitch Rate Sensor (PRS) and Yaw Rate Sensor (YRS), respectively. Embodiments that may become obvious to those skilled in the art include 6-axis, 9-axis or magnetometer sensors or other similar sensors for various measurements—e.g., rates, accelerations, forces, torques etc.—generated during the dynamic active control of the vessel. The software module 202 communicatively connected to the WEDs 602, 606 can be programmed to act (make certain iterative decisions) based on information received from an attitude sensor (e.g., pitch and roll) as well as from a global positioning system (GPS) sensor located at a pre-selected fixed position on the marine vessel 2000.

Figure 2:
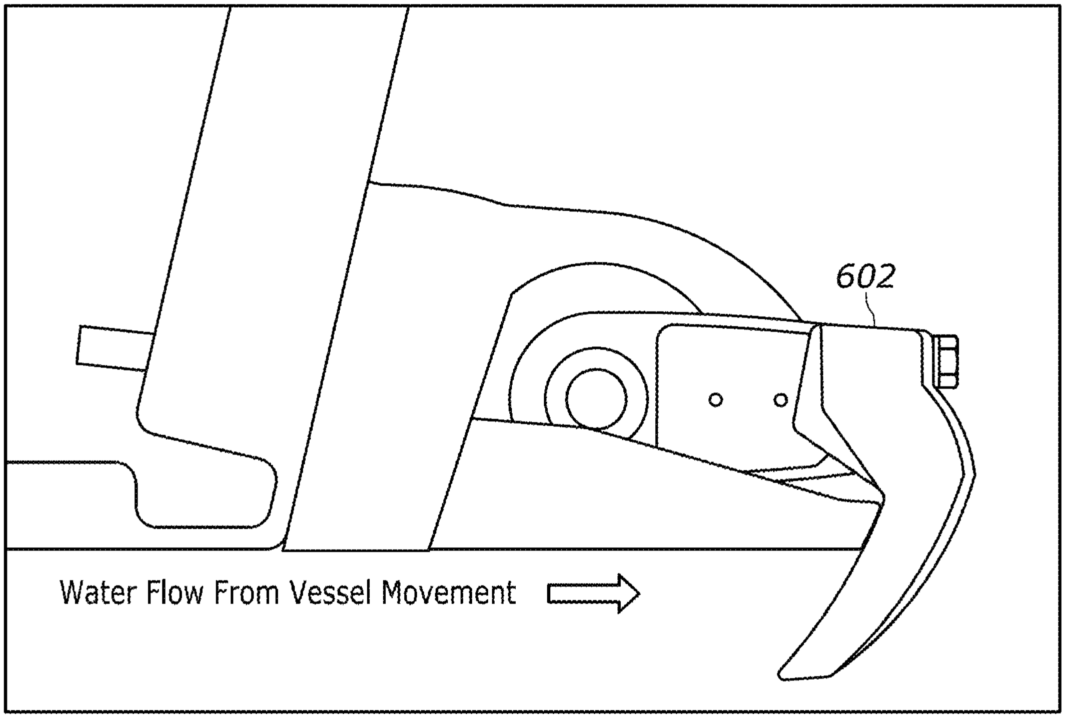
FIGS. 2 and 3 illustrate a fully deployed and a fully retracted water engagement device according to one aspect of the present disclosure.
Figure 3:
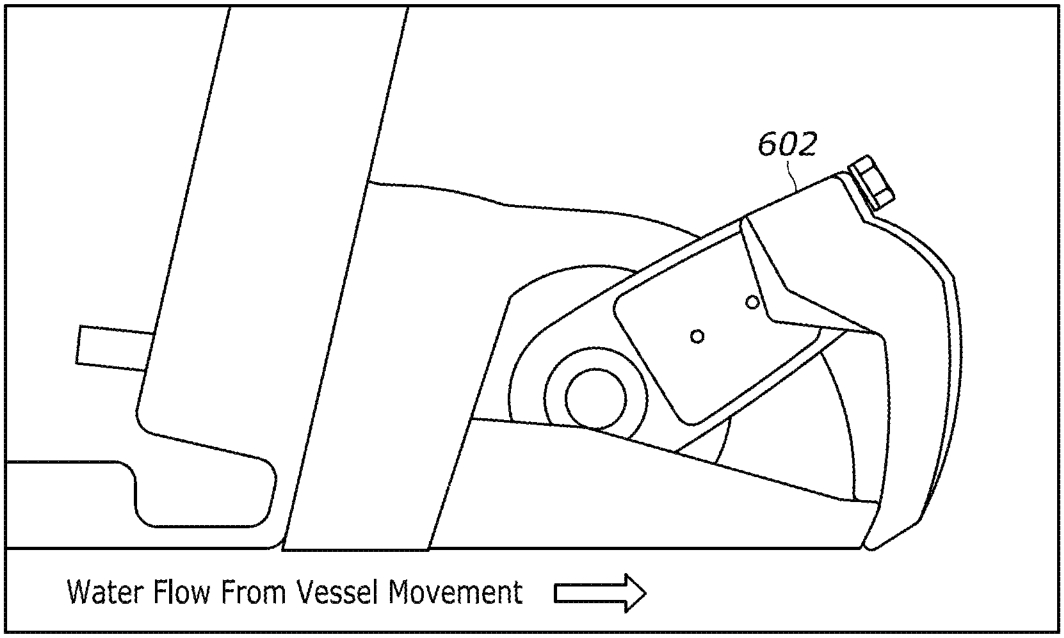

Referring back to FIG. 1, the DACS 1000 comprises at least one pair of WED actuators mounted on the transom of the marine vessel 2000 and configured for fast deployment of the WEDs 602, 606—the system 1000 providing total vessel pitch axis control by fast symmetric deployment of the WEDs 602, 606 coupled with engine trim adjustments. As illustrated, the WEDs 602, 606 mounted on the transom of the vessel 2000 and configured for fast deployment into the water at 100 mm/s or more—preferably faster than 250 mm/s. FIGS. 2 and 3 illustrate a fully deployed and a fully retracted water engagement device according to one aspect of the present disclosure.

Figure 4:
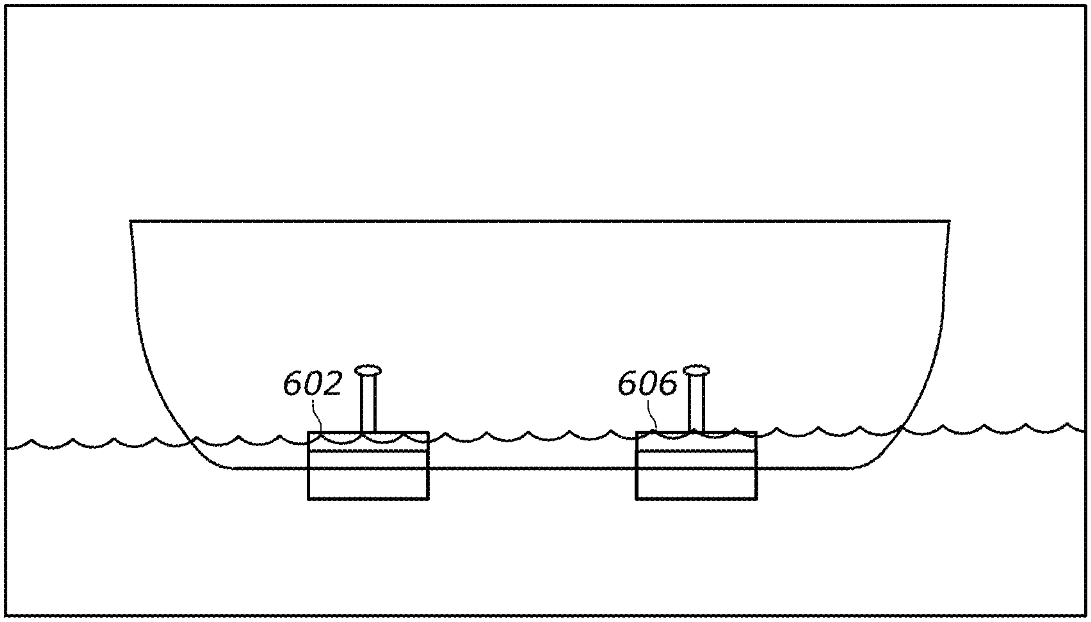
FIGS. 4 and 5 illustrate a symmetrical deployment and a differential deployment of at least one pair of water engagement devices according to one aspect of the present disclosure.
Figure 5:
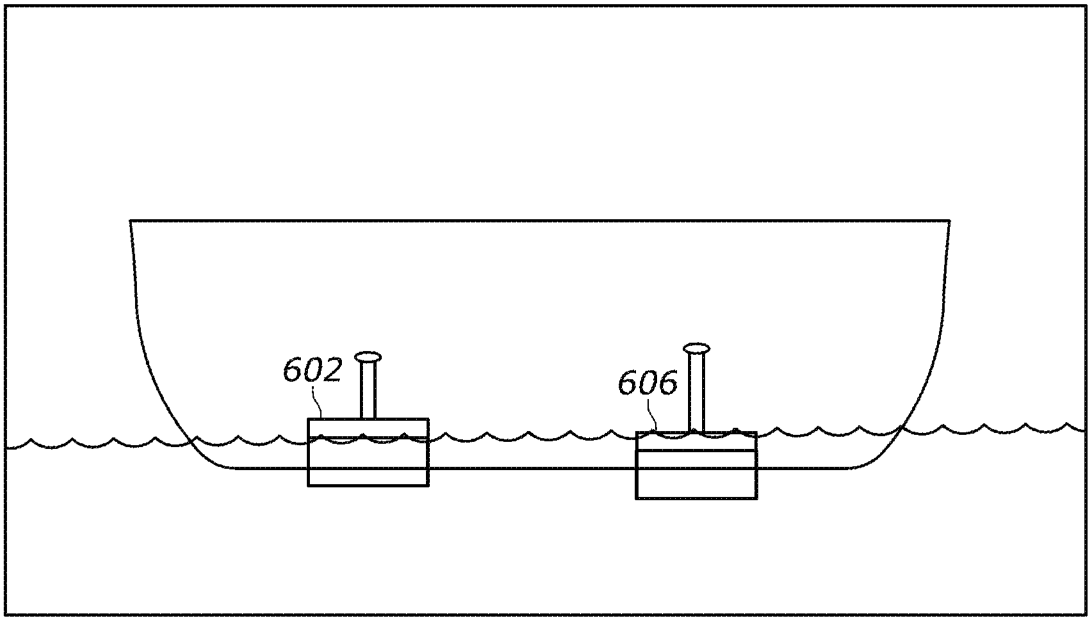

As illustrated in FIG. 4, the DACS 1000 is also configured to provide total vessel pitch control by symmetric deployment of the WEDs 602, 606 coupled with engine trim adjustment and providing optimum stability control of the vessel. For instance, if the WED 602 is halfway (50 percent)

down, a sensor can send a signal to the software module 202 which in turn can command the actuator attached to the WED 602 to make adjustments both in the up and down positions for the WED 602. The DACS 100 can further optimize the relationship between the WED bias and the engine trim to deliver the best-case dynamic active control for the marine vessel. As further illustrated in FIG. 5, the system 1000 is further configured to provide total roll and heading control by differentially deploying WEDs 602, 606 to (1) counter rolling motions while simultaneously adjusting any engine steering position to counter the steering moment associated with WED delta position; and (2) providing adjustment of the engine steering angle to counter yaw moments produced by gyroscopic stabilization systems. The software module 202 comprising various algorithms running a proportional-integral-derivative control loop (PID) for continuously capturing data related to the difference between the commanded roll angle and the measured roll angle-the delta angle-and applying a responsive and accurate correction on the delta position between the WEDs 602 and 606 on the port and starboard sides of the marine vessel 2000 respectively (as shown in FIGS. 4 and 5).

In another aspect of the present disclosure, during operation of the marine vessel 2000, the system 1000 continuously monitors and measures data/feedback from the sensors and send command signals to instruct the actuator systems for fast deployment of WEDs 602, 606 to counteract certain dynamic active motions of the marine vessel (e.g., motions in the 0-3 Hz frequency spectrum across the roll, yaw and pitch axes) and provide the required dynamic active control of the marine vessel.

In another aspect of the present disclosure, DACS 1000 as disclosed herein is configured to make the necessary adjustment to the engine steering angle to control the heading of the marine vessel 2000 and counter the resulting heading change resulting from WED delta position. The DACS 1000 can measure a change in steering position and predict the resulting roll motion generated from the steering position change while automatically generating WED delta position to counter the roll motion that will ultimately result from this steering position change.

In another aspect of the present disclosure, the DACS 1000 is configured to adjust the vessel 2000 trim angle by symmetric deployment (shown in FIG. 4) of the WEDs 602, 606 coupled with engine trim adjustment. Controlling the engine trim adjustment gives the operator and/or the system the opportunity to optimize fuel efficiency or stabilization performance of the marine vessel 2000. The performance of the marine vessel 2000 is further optimized, by the DACS guaranteeing that the WEDs 602, 606 will maintain an average, non-zero position (or "bias") and adjusting the engine trim to enable the bias. In addition, the DACS 1000 is configured to optimize the engine trim for fuel efficiency purposes by delivering the commanded trim, even if that action results in less than optimum DACS performance.

In yet another aspect of the present disclosure, the DACS disclosed herein provides for at least two optimization strategies by allowing the DACS to be controlled by the WED average position as well as by the engine trim. The DACS is configured to receive a desired trim angle from the operator and adjust the average positions of the WEDs as well as the engine trim angle in an effort to achieve the operator's desired trim angle. As disclosed herein, the DACS is configured to adjust the relationship between engine trim and WED average position and optimize either the performance of the DACS system or fuel efficiency of the engine.

In another aspect of the present disclosure, during operation as the marine vessel 2000 moves through the water the system 1000 is configured to adjust the engine steering position to counter the yaw moment (by measuring the changing drag force) associated with the WEDs 602, 606 delta deployment. The software module 202 can provide a signal to the engine control module 302 of the engine for adjusting the steering position of the engine.

Referring back to FIGS. 1-5, the DACS 1000 is configured to measure the relationship between the steering position of the engine and a desired WED delta position—the difference between starboard WED and port WED and their average positions. For instance, as the WED delta position is increased, the software module 202 sends a signal to the engine control module 302 to adjust the steering position of the engine of the marine vessel 2000. The ability of the system 1000 to counter the steering moment (by measuring the changing drag force) associated with the WED's delta deployment is instrumental in providing optimized total roll and heading control, as disclosed herein.

In another aspect of the present disclosure, the software module 202 is can receive and process data on the steering position of the engine of the marine vessel 2000. Specifically, the processor is programmed to measure the relationship between the steering position of the engine and the WED 602, 606 delta position. Based on the measured data, the software module 202 can generate and send predictive signals to the actuator to adjust the WEDs 602, 606 by differentially deploying each of the WEDs 602, 606 to counter rolling motions and simultaneously adjust the engine steering position to counter the steering moment associated with the WED delta position, as shown in FIG. 5. As further illustrated in FIGS. 4 and 5, the software module 202 can instruct the actuator mechanism to adjust the deployments of one or more of the WEDs—moving the WEDs 602, 606 (or additional WEDs) together or moving only one of the WEDs 602 or 606, or various patterned combinations of movements thereof. If more than one WED is moved, they may be moved in parallel or opposite to each other, to the deployments of the same magnitude as one another, or at different deployments, as needed simultaneously to counter unnecessary roll and pitch motions and optimize total vessel pitch axis control by fast symmetric deployment of coupled with engine trim adjustments.

In another aspect of the present disclosure, the DACS 1000 provides the operator with the option to control and change (if necessary) the commanded roll angle of the marine vessel 2000. During operation of the marine vessel 2000, if waves hit a boat on the starboard side the operator has the option to dynamically change the commanded roll angle and/or instruct the operator via the user interfaces of to tilt the boat down to the port side.

The processing and computing of the data—specifically the processing of signal by the software module 202 to change the deployment angles of the WEDs/Controllers 602, 606 based on the difference between the commanded and the actual (measured) roll angle, is one of the key innovative features of the improved DACS. An operator can change the commanded roll angle (e.g., −5 to 5 degrees) which triggers the decision loop within the control system and generates the output signal to instruct the actuator system for fast (at 100 mm/s or more) delta deployment of the WEDs 602, 606.

It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden. It is further understood that the scope of the present disclosure fully encompasses other embodiments that may become obvious to those skilled in the art.

Differential and differentially are defined within this document as unequal, off center and/or involving differences in: angle, speed, rate, direction, direction of motion, output, force, moment, inertia, mass, balance, application of comparable things, etc. The terms Dynamic and/or Dynamic Active Control may mean the immediate action that takes place at the moment they are needed. Any use of the term immediate, in this application, means that the control action occurs in a manner that is responsive to the extent that it prevents or mitigates vessel motions and attitudes before they would otherwise occur in the uncontrolled situation. A person of ordinary skilled in the art understands the relationship between sensed motion parameters and required response in terms of the maximum overall delay that can exist while still achieving the control objectives. Dynamic and/or Dynamic Active Control may be used in describing interactive hardware and software systems involving differing forces and may be characterized by continuous change and/or activity. Dynamic may also be used when describing the interaction between a vessel and the environment. As stated above, marine vessels may be subject to various dynamic forces generated by its propulsion system as well as the environment in which it operates. Any reference to vessel attitude may be defined as relative to three rotational axes including pitch attitude or rotation about the Y, transverse or sway axis, roll attitude or rotation about the X, longitudinal or surge axis, and yaw attitude or rotation about the Z, vertical or heave axis.

Various features of the example embodiments described herein may be implemented using hardware, software, or a combination thereof and may be implemented in one or more computer systems or other processing systems. However, the manipulations performed in these embodiments were often referred to in terms, such as determining, which are commonly associated with mental operations performed by a human operator. No such capability of a human operator is necessary in any of the operations described herein. Rather, the operations may be completely implemented with machine operations. Useful machines for performing the operation of the exemplary embodiments presented herein include general purpose digital computers or similar devices. With respect to hardware, a CPU typically includes one or more components, such as one or more microprocessors for performing the arithmetic and/or logical operations required for program execution, and storage media, such as one or more disk drives or memory cards (e.g., flash memory) for program and data storage, and a random-access memory for temporary data and program instruction storage. With respect to software, a CPU typically includes software resident on a storage media (e.g., a disk drive or memory card), which, when executed, directs the CPU in performing transmission and reception functions.

The CPU software may run on an operating system stored on the storage media, such as, for example, UNIX or Windows (e.g., NT, XP, Vista), Linux, and the like, and can adhere to various protocols such as the Ethernet, ATM, TCP/IP, CAN, LIN protocols and/or other connection or connectionless protocols. As is known in the art, CPUs can run different operating systems, and can contain different types of software, each type devoted to a different function, such as handling and managing data/information from a particular source or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include multiple separate CPUs, wherein each is dedicated to a separate application, such as, for example, a data application, a voice application, and a video application. Software embodiments of the example embodiments presented herein may be provided as a computer program product, or software, that may include an article of manufacture on a machine-accessible or non-transitory computer-readable medium (i.e., also referred to as "machine readable medium") having instructions. The instructions on the machine-accessible or machine-readable medium may be used to program a computer system or other electronic device. The machine-readable medium may include, but is not limited to, floppy diskettes, optical disks, CD-ROMs, magneto-optical disks, USB thumb drives, and SD cards or other type of media/machine-readable medium suitable for storing or transmitting electronic instructions. The techniques described herein are not limited to any particular software configuration. They may find applicability in any computing or processing environment. The terms "machine-accessible medium," "machine-readable medium," and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. It is to be noted that it is common-as a person skilled in the art can contemplate—in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden.

It is further understood that the scope of the present disclosure fully encompasses other embodiments that may become obvious to those skilled in the art. Features illustrated or described as part of one embodiment can be used in another embodiment to yield a still further embodiment. Thus, it is intended that the present disclosure cover such modifications and variations as come within the scope of the appended claims and their equivalents. It is to be understood by one of ordinary skill in the art that the present discussion is a description of exemplary embodiments only and is not intended as limiting the broader aspects of the present disclosure, which broader aspects are embodied in the exemplary constructions.

The invention claimed is:

1. A dynamic active control system for a marine vessel, the system comprising:

at least one sensor configured to be connected to the marine vessel;

a plurality of water engagement devices (each, a WED), each including an actuator configured to retract and deploy a water engagement element connected to the actuator, and each further configured to be mounted on a transom of the marine vessel, and wherein at least one of the plurality of water engagement devices is disposed on a first side of a longitudinal axis of the marine vessel and at least one of the plurality of water engagement devices is disposed on a second side of the longitudinal axis;

a software module that is communicatively and operatively connected to the at least one sensor and the plurality of water engagement devices, wherein the software module is configured to:

receive, from the at least one sensor, at least one of a roll rate and a roll angle, at least one of a pitch rate and a pitch angle, at least one of a yaw rate and a yaw angle, and a WED position of each of the plurality of water engagement devices;

determine a water engagement device delta position based on a difference between the WED position received for the at least one water engagement device disposed on the first side of the longitudinal axis and the WED position received for the at least one water engagement device disposed on the second side of the longitudinal axis;

generate a first control signal based on the at least one of the roll rate and the roll angle, at least one of the pitch rate and the pitch angle, at least one of the yaw rate and the yaw angle, and the water engagement device delta position, wherein the first control signal is configured to counteract dynamic motions of the marine vessel;

send, to the actuator of each of the plurality of water engagement devices, the first control signal, wherein the actuator of each of the plurality of water engagement devices is configured to change the WED position of the respective water engagement device in response to receiving the first control signal to counteract dynamic motions of the marine vessel.

2. The system of claim 1, wherein the at least one sensor includes a group of sensors embedded within the software module.

3. The system of claim 1, wherein the actuator of each of the plurality of the water engagement devices changes the WED position of the respective water engagement device in 100 mm/s or more.

4. The system of claim 1, wherein the software module is further configured to:

determine a pitch moment of the marine vessel introduced by the dynamic motions of the marine vessel;

generate a second control signal based on the at least one of the pitch rate and the pitch angle and water engagement device delta position;

send, to the actuator of each of the plurality of water engagement devices, the second control signal, to change an average of the WED position of the respective water engagement device in response to receiving the second control signal to counteract the pitch moment.

5. The system of claim 1, further comprising at least one input device communicatively and operatively connected to the software module.

6. The system of claim 5, wherein the at least one input device is a navigational system, a marine navigation unit, a marine guidance unit, a multiple function display unit, a keypad, a steering wheel, a control lever, a joystick, a throttle lever, or a shift lever.

7. The system of claim 1, wherein the at least one sensor comprises a multiple axis inertial sensor for measuring a rate of change or an acceleration along respective axes in relation to the dynamic motions of the marine vessel.

8. The system of claim 1, wherein the at least one sensor comprises at least one Roll Rate Sensor (RRS), Pitch Rate Sensor (PRS) and Yaw Rate Sensor (YRS) to measure the roll rate, pitch rate and yaw rate of the marine vessel resulting from the dynamic motions of the marine vessel.

9. The system of claim 1, wherein the at least one sensor comprises an attitude sensor communicatively and operatively connected to the software module such that in response to an output from the attitude sensor the software module outputs a third control signal to the actuator of each of the plurality of water engagement devices to command adjustment of the water engagement device delta position.

10. The system of claim 1, wherein the software module is further configured to run program instructions in a proportional-integral-derivative control loop to:

determine a measured roll angle of the marine vessel introduced by the dynamic motions of the marine vessel;

generate a fourth control signal based on a desired marine vessel roll angle, the at least one of the roll rate and the roll angle, and the water engagement device delta position;

send, to the actuator of each of the plurality of water engagement devices, the fourth control signal, to change the WED position of the respective water engagement device and the water engagement device delta position in response to receiving the fourth control signal to implement the desired marine vessel roll angle.

11. The system of claim 1, further comprising an engine configured to be connected to the marine vessel and a trim actuator configured to be connected to at least one of the engine and the marine vessel to adjust an engine trim angle, and wherein the software module is further configured to:

determine a pitch moment of the marine vessel introduced by the dynamic motions of the marine vessel;

generate a fifth control signal based on a desired marine vessel trim angle, the at least one of the pitch rate and the pitch angle, and the water engagement device delta position;

send, to at least one of the actuator of each of the plurality of water engagement devices and the trim actuator, the fifth control signal, to change at least one of an average of the WED position of the respective water engagement device and the engine trim angle in response to receiving the fifth control signal to implement the desired trim angle.

12. The system of claim 1, further comprising a distribution module configured to be connected to the marine vessel, wherein the distribution module is operatively and communicatively connected to the software module, the plurality of water engagement devices and a gyroscopic stabilization device via power and communication cables.

13. The system of claim 1, wherein the at least one sensor comprises a global positioning system sensor communicatively and operatively connected to the software module such that in response to an output from the global positioning system sensor, the software module outputs a sixth control signal to the actuator of each of the plurality of water engagement devices to command adjustment of the water engagement device delta position.

14. The system of claim 5, wherein the software module is further configured to receive an input from the at least one input device for at least one of a desired marine vessel trim angle, a desired marine vessel roll angle and a desired heading of the marine vessel, and in response thereto, adjusts at least one of an average water engagement device delta position, an engine trim angle of an engine configured to be connected to the marine vessel and a steering actuator configured to be connect to the marine vessel.

15. The system of claim 1, wherein the software module is further configured to run program instructions for a total pitch axis control strategy comprising symmetrical deployment of the plurality of water engagement devices while simultaneously adjusting an engine trim angle of an engine configured to be connected to the marine vessel.

16. The system of claim 1, wherein the software module is further configured to adjust a relationship between an average of the WED position of the respective water engagement device and an engine trim angle of an engine configured to be connected to the marine vessel to optimize a fuel efficiency of the engine.

17. The system of claim 1, further comprising an engine configured to be connected to the marine vessel and a trim actuator configured to be connected to at least one of the engine and the marine vessel, and wherein the software module is further configured to:

determine a pitch moment of the marine vessel introduced by the dynamic motions of the marine vessel;

generate a seventh control signal based on the at least one of the pitch rate and pitch angle and the water engagement device delta position;

send, to at least one of the actuator of each of the plurality of water engagement devices and the trim actuator, the seventh control signal, to change at least one of an average of the WED position of the respective water engagement device and an engine trim angle of the engine in response to receiving the seventh control signal to counteract the pitch moment.

* * * * *